United States Patent
Han

(10) Patent No.: US 11,473,795 B2
(45) Date of Patent: Oct. 18, 2022

(54) VENTILATION TYPE AIR CLEANER AND VENTILATION SYSTEM HAVING THE SAME

(71) Applicant: CS E&L Co., Ltd., Incheon (KR)

(72) Inventor: Won Jae Han, Incheon (KR)

(73) Assignee: CS E&L Co., Ltd., Incheon (KR)

( * ) Notice: Subject to any disclaimer, the term of this patent is extended or adjusted under 35 U.S.C. 154(b) by 217 days.

(21) Appl. No.: 16/801,869

(22) Filed: Feb. 26, 2020

(65) Prior Publication Data

US 2021/0197110 A1 Jul. 1, 2021

(30) Foreign Application Priority Data

Dec. 30, 2019 (KR) .................... 10-2019-0177690

(51) Int. Cl.
*F24F 8/90* (2021.01)
*B01D 46/00* (2022.01)
(Continued)

(52) U.S. Cl.
CPC ............ *F24F 8/90* (2021.01); *B01D 46/0005* (2013.01); *B01D 46/0032* (2013.01);
(Continued)

(58) Field of Classification Search
CPC .... F24F 8/117; F24F 8/133; F24F 8/22; F24F 8/90; F24F 8/108; F24F 8/192; F24F 12/00; F24F 12/006; F24F 7/08; F24F 13/28; F24F 2110/64; F24F 2203/10; B01D 46/0056; B01D 46/0082; B01D 46/0005; B01D 46/0028; B01D 46/0032; B01D 46/0063; B01D 46/0078; B01D 46/0079; B01D 46/0084; B01D 46/12; B01D 46/442;
(Continued)

(56) References Cited

U.S. PATENT DOCUMENTS

2004/0079234 A1* 4/2004 Gorbulsky ......... B01D 46/0056
96/234
2019/0041072 A1* 2/2019 Okano .................... F24F 13/28

FOREIGN PATENT DOCUMENTS

| KR | 200326102 Y1 | 9/2003 | |
| KR | 200392908 Y1 | 8/2005 | |
| KR | 20110008430 A * | 1/2011 | ......... B01D 46/0005 |

OTHER PUBLICATIONS

KR20110008430A_ENG (Espacenert machine translation of Choi) (Year: 2011).*

* cited by examiner

*Primary Examiner* — Gabriel E Gitman

(74) *Attorney, Agent, or Firm* — Osha Bergman Watanabe & Burton LLP

(57) ABSTRACT

A ventilation type air cleaner includes a housing having a central rotating shaft including a purification part, a washing part, and a sterilization part in a circumferential direction with respect to the central rotating shaft, a rotating unit installed to be rotatable about the central rotating shaft as a rotation center in the housing, a filter assembly detachably coupled to the rotating unit and configured to sequentially pass through the purification part, the washing part, and the sterilization part according to rotation of the rotating unit, an intake duct connected to the housing and configured to guide a flow of air introduced to the purification part, and an exhaust duct connected to the housing and configured to guide a flow of air discharged from the purification part.

15 Claims, 9 Drawing Sheets

(51) Int. Cl.
*F24F 12/00* (2006.01)
*B01D 46/44* (2006.01)
*F24F 8/192* (2021.01)
*B01D 46/69* (2022.01)
*B01D 46/84* (2022.01)
*B01D 46/66* (2022.01)
*F24F 13/28* (2006.01)
*B01D 46/79* (2022.01)
*F24F 7/08* (2006.01)

(52) U.S. Cl.
CPC ..... *B01D 46/0056* (2013.01); *B01D 46/0084* (2013.01); *B01D 46/442* (2013.01); *B01D 46/69* (2022.01); *B01D 46/785* (2022.01); *B01D 46/84* (2022.01); *F24F 8/192* (2021.01); *F24F 12/00* (2013.01); *F24F 12/006* (2013.01); *F24F 13/28* (2013.01); *B01D 46/79* (2022.01); *B01D 2273/10* (2013.01); *B01D 2279/50* (2013.01); *F24F 7/08* (2013.01); *F24F 2203/10* (2013.01); *Y02B 30/56* (2013.01)

(58) Field of Classification Search
CPC ............................ B01D 53/06; B01D 2273/10; B01D 2279/50; B01D 47/06; B01D 50/006
See application file for complete search history.

VENTILATION TYPE AIR CLEANER AND VENTILATION SYSTEM HAVING THE SAME

CROSS-REFERENCE TO RELATED APPLICATION

This application claims benefit of priority to Korean Patent Application No. 10-2019-0177690 filed on Dec. 30, 2019 in the Korean Intellectual Property Office, the disclosure of which is incorporated herein by reference in its entirety.

BACKGROUND

1. Field

The present disclosure relates to a ventilation type air cleaner for purifying air flowing into a room from outside and a ventilation system including the same.

2. Description of Related Art

In general, in order to discharge contaminated indoor air of a building (apartment houses, offices, large marts, department stores, etc.) to the outside and supply external fresh air to a room, a ventilation system using a total heat exchanger is used.

A total heat exchanger is provided to exchange heat between indoor air discharged to the outside and external air (outdoor air) flowing into a room so that external cold air (or hot air) may not directly flow into the room. Here, since dust (including foreign matter, fine dust, ultrafine dust, etc.) is included in the external air being introduced, the total heat exchanger includes a pre-filter and a high efficiency particulate air filter (HEPA) filter for filtering the dust.

Meanwhile, a notification of the Ministry of Land, Infrastructure and Transport stipulates that a HEPA filter having a fine dust collection rate of 90% or greater shall be applied, and thus, HEPA filters having a high grade of a fine dust collection rate of 99% are rarely installed. Installation of a low grade HEPA filter means that ultrafine dust flows into rooms as is.

In addition, when a temperature difference between indoor air and external air is significant, dew condensation may occur in a heat exchange element equipped with a pre-filter and a HEPA filter. In this case, the pre-filter and the HEPA filter are no longer able to fulfill own function.

In addition, a replacement cycle of the pre-filter and the HEPA filter is usually as short as merely 3 months. Therefore, maintenance thereof requires considerable efforts and cost in the users' position.

SUMMARY

An aspect of the present disclosure may provide a ventilation type air cleaner that may complement a dust filtering function of a total heat exchanger, while the total heat exchanger is maintained as is to perform an original heat exchange function.

An aspect of the present disclosure may also provide a ventilation system capable of more efficiently managing indoor air quality by cooperatively operating a ventilation type air cleaner and an indoor exhaust device.

In an aspect, a ventilation type air cleaner includes: a housing having a central rotating shaft therein and including a purification part, a washing part, and a sterilization part in a circumferential direction with respect to the central rotating shaft; a rotating unit installed to be rotatable about the central rotating shaft as a rotation center in the housing; a filter assembly detachably coupled to the rotating unit and configured to sequentially pass through the purification part, the washing part, and the sterilization part according to rotation of the rotating unit; an intake duct connected to the housing and configured to guide a flow of air introduced to the purification part; and an exhaust duct connected to the housing and configured to guide a flow of air discharged from the purification part, wherein the intake duct and the exhaust duct are connected between the outside and a total heat exchanger so that external air flows into the total heat exchanger after passing through the purification part.

The intake duct may communicate with an outdoor area so that external air flows into the purification part, and the exhaust duct may communicate with an external air inlet of the total heat exchanger so that air passing through the purification part flows into the total heat exchanger.

The housing may include: an intake port opened at an off-centered position with respect to the central rotating shaft at a lower portion of the housing, communicating with the purification part, and connected to the intake duct; and an exhaust port opened at an off-centered position with respect to the central rotating shaft at an upper portion of the housing, communicating with the purification part, and connected to the exhaust duct.

The rotating unit may include a plurality of blocking plates disposed radially about the central rotating shaft, the filter assembly may be disposed between the plurality of blocking plates, and the ventilation type air cleaner may further include: a driving unit configured to rotate the rotating unit such that regions between the plurality of blocking plates are located to correspond to the purification part, the washing part, and the sterilization part, respectively.

The ventilation type air cleaner may further include: a spray unit configured to spray wash water and hot air to the filter assembly located at the washing part; and an ultraviolet irradiation unit configured to irradiate ultraviolet rays to the filter assembly located at the sterilization part.

The spray unit may include: a transfer pipe disposed in the central rotating shaft and extending along the central rotating shaft; a steam supply pipe connected to one side of the transfer pipe and configured to supply steam to the transfer pipe; a hot air supply pipe connected to one side of the transfer pipe and configured to supply hot air to the transfer pipe; and a spray nozzle connected to the other side of the transfer pipe and configured to spray steam and hot air to the filter assembly.

The ventilation type air cleaner may further include: a bypass duct connected to each of the washing part and the indoor air inlet unit of the total heat exchanger; and a fan installed on at least one surface of the housing defining the washing part and configured to discharge hot air in the washing part to the bypass duct.

The filter assembly may include a conductive fiber filter formed by coating a fiber material with conductive particles, and the intake duct or the purification part may include a fine dust charging part configured to charge fine dust introduced therein.

The conductive fiber filter may be stacked in one direction to form a multi-stage form, a porosity of the conductive fiber filter may gradually decrease along the one direction.

The exhaust duct may be equipped with a HEPA filter filtering ultrafine dust passing through the filter assembly.

In another aspect, a ventilation system includes: the ventilation type air cleaner configured to intake external air, purify the intaken external air, and discharge the purified air to a total heat exchanger described above; and an exhaust device configured to supply air discharged from the total heat exchanger to a room, wherein the exhaust device includes a discharge port; and an exhaust fan configured to intake air discharged from the total heat exchanger and discharge the intaken air to the discharge port.

The intake duct or the purification part of the ventilation type air cleaner may include a first sensor configured to measure air quality, and the exhaust device may include a second sensor configured to measure air quality.

The ventilation system may further include a controller configured to transmit an alarm to a predetermined terminal when an air quality value detected by the second sensor exceeds a predetermined air quality value in a state in which the exhaust fan is actuated.

The ventilation system may further include a controller configured to collect data measured by the first and second sensors and transmit air quality information related to the collected data to a predetermined terminal.

The air quality information may be information schematizing air quality of the outside and the room.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, a ventilation type air cleaner and a ventilation system having the same will be described in more detail with reference to the accompanying drawings.

In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

Singular forms "a", "an" and "the" in the present disclosure are intended to include the plural forms as well, unless the context clearly indicates otherwise.

It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Figure 1:
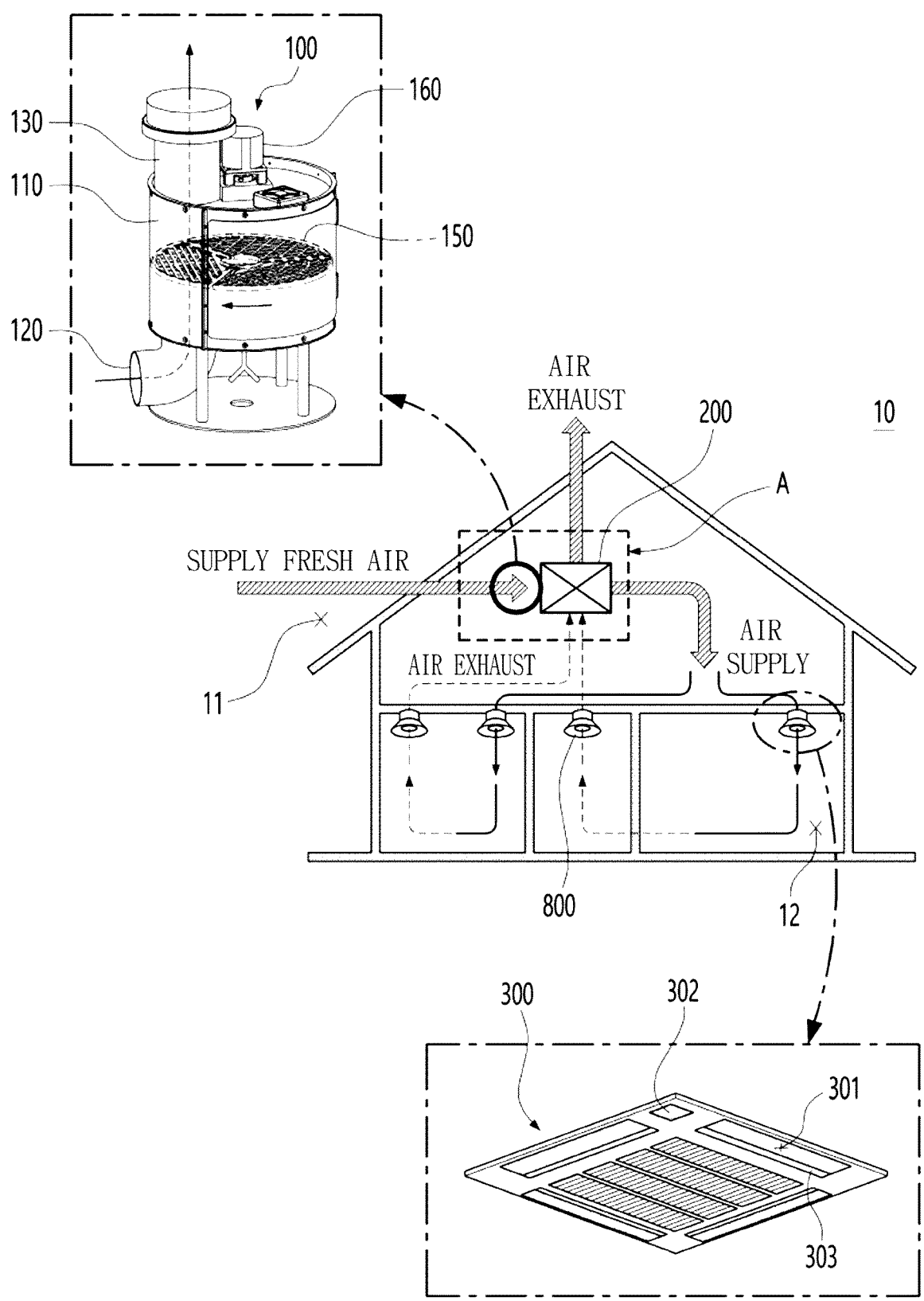
FIG. 1 is a conceptual view illustrating a ventilation system according to an embodiment of the present disclosure.
Figure 2:
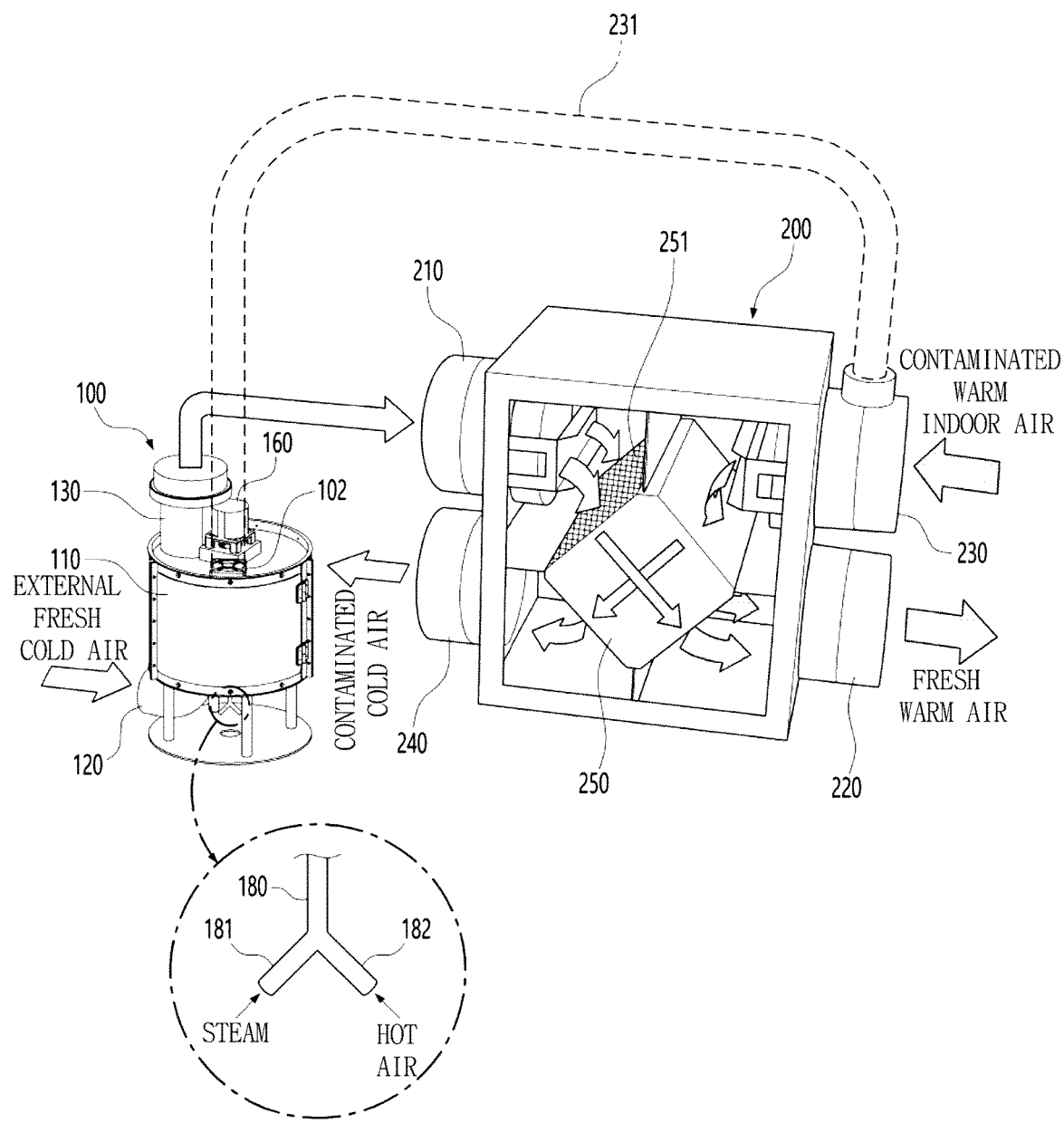
FIG. 2 is an enlarged conceptual view of portion "A" of FIG. 1.

FIG. 1 is a conceptual view illustrating a ventilation system 10 according to an embodiment of the present disclosure, and FIG. 2 is an enlarged conceptual view of portion "A" of FIG. 1.

Referring to FIGS. 1 and 2, the ventilation system 10 discharges contaminated air of a room 12 to an outdoor area 11, purifies air of the outdoor area 11 and introduces the purified air to the room 12. The ventilation system 10 includes a ventilation type air cleaner 100, an exhaust device 300, and a controller 400.

As described above in the background, in the related art, external air flows directly into the total heat exchanger 200, but, in the present disclosure, external air is introduced to the total heat exchanger 200 after passing through the ventilation type air cleaner 100.

Figure 6:
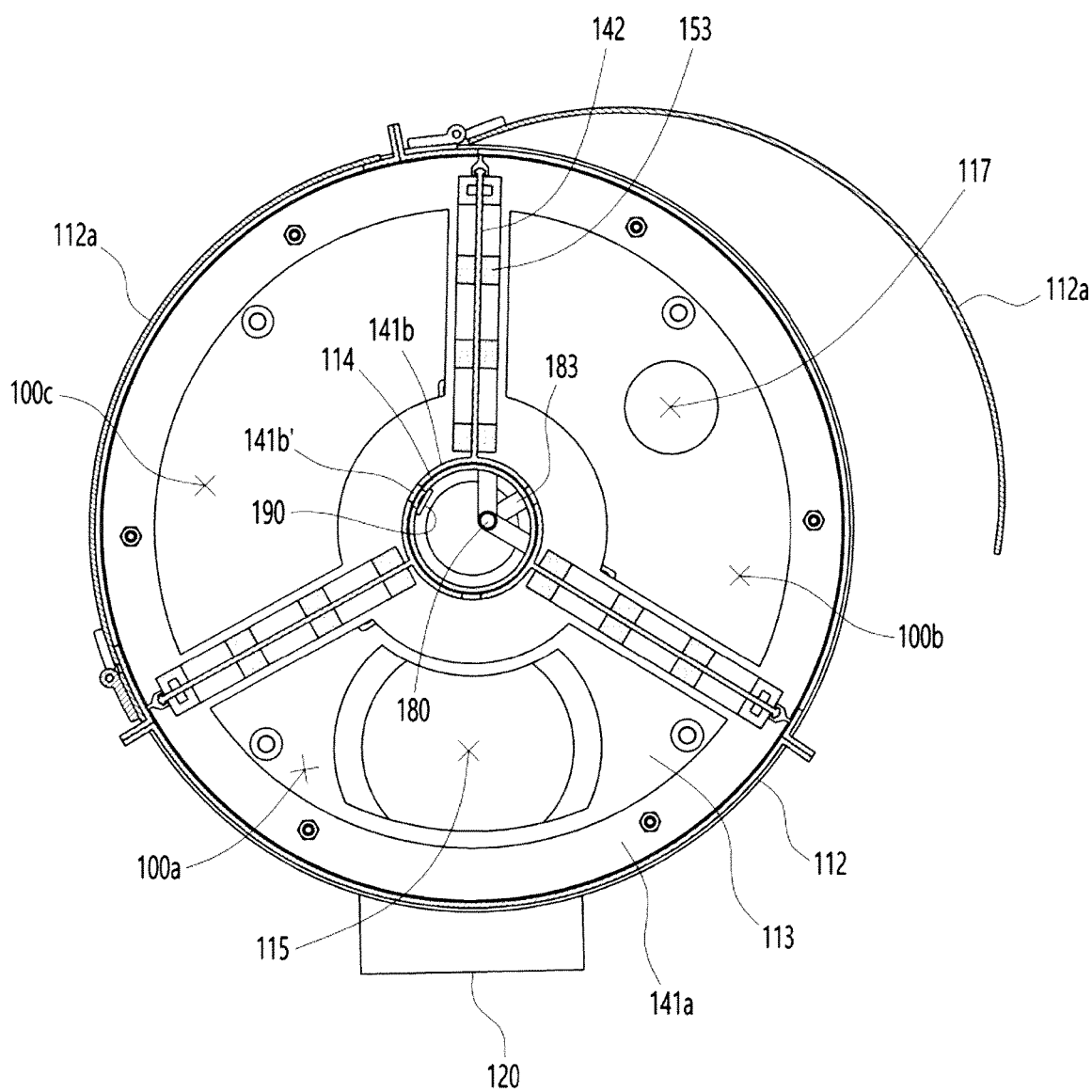
FIG. 6 is a cross-sectional view taken along the line B-B illustrated in FIG. 3.

The ventilation type air cleaner 100 includes a purification part 100a filtering dust (including foreign matter, fine dust, ultrafine dust, etc.) using a filter assembly 150, a washing part 100b washing the filter assembly 150, and a sterilization part 100c sterilizing the filter assembly 150 (see FIG. 6).

Here, the filter assembly 150 circulates sequentially through the purification part 100a, washing part 100b, and sterilization part 100c by rotation. That is, the filter assembly 150 is configured to filter dust in the purification part 100a, be washed in the washing part 100b, be sterilized in the sterilization part 100c, and then be placed in the purification part 100a. As described later, the ventilation type air cleaner 100 may further include a HEPA filter 170 filtering ultrafine dust that has passed through the filter assembly 150.

By the air purification mechanism, the ventilation type air cleaner 100 may be configured to filter ultrafine dust to a 99% level.

The ventilation type air cleaner 100 is configured to intake external air through an intake duct 120, filter dust in the purification part 100a, and discharge the filtered air to the total heat exchanger 200 through an exhaust duct 130. In terms of a flow of air, the ventilation type air cleaner 100 is disposed between the outside and the total heat exchanger 200.

For reference, the total heat exchanger 200 includes an external air inlet 210 through which external air is introduced, an air supplier 220 supplying air to a room 12, an indoor air inlet 230 through which air of the room 12 is introduced, and an air outlet 240 through which air is discharged to the outside. The external air inlet 210 and the air supplier 220 form an air inlet flow path, and the indoor air inlet 230 and the air outlet 240 form an air outlet flow path.

The total heat exchanger 200 includes a heat exchange element 250 to perform heat exchange between air flowing in the air inlet flow path and air flowing in the air outlet flow path. The heat exchange element 250 is disposed between the external air inlet 210 and the air supplier 220 and connect them to complete an air supply flow path and disposed between the indoor air inlet 230 and the air outlet 240 and connect them to complete an air outlet flow path.

As illustrated, external air introduced through the external air inlet 210 may be colder than indoor air introduced through the indoor air inlet 230. In the heat exchange element 250, waste heat in the air discharged through the air outlet flow path is recovered and supplied to the air introduced through the air supply flow path. Accordingly, fresh external air is supplied to the room in a warm state, and contaminated indoor air is discharged to the outside in a cold state.

A filter 251 (prefilter, HEPA filter, etc.) may be provided on one surface of the heat exchange element 250 facing the external air inlet 210, so that dust in the air flowing through the external air inlet 210 may be filtered.

Referring to the structure of the total heat exchanger 200 described above, in terms of the flow of air, the ventilation type air cleaner 100 is disposed between the outside and the external air inlet 210. Specifically, the intake duct 120 of the ventilation type air cleaner 100 communicates with the outdoor area 11 so that external air flows into the purification part 100a, and the exhaust duct 130 of the ventilation type air cleaner 100 communicates with the external air inlet 210 of the total heat exchanger 200 so that air passing through the purification part 100a is introduced into the total heat exchanger 200.

As such, since the ventilation type air cleaner 100 which filters ultrafine dust to the 99% level before external air flows into the total heat exchanger 200 and has an automatic cleaning function is provided, a burden of dust filtering of the total heat exchanger 200 may be reduced, thereby reducing time and cost required for maintenance.

In particular, since the filter assembly 150 of the ventilation type air cleaner 100 is configured to filter dust in the purification part 100a, sequentially pass through the washing part 100b and the sterilization part 100c, and then be placed in the purification part 100a again, separate filter replacement is not necessary and the filter assembly 150 may be semi-permanently used.

Therefore, by replacing only the HEPA filter 170 installed at the exhaust duct 130 (long replacement cycle), it is possible to delay the replacement cycle of the filter 251 provided in the total heat exchanger 200, thereby significantly reducing efforts and cost required for maintenance.

Meanwhile, the air discharged from the total heat exchanger 200 is supplied to the room 12 by the exhaust device 300. The exhaust device 300 includes a discharge port 301 and an exhaust fan (not shown). The exhaust device 300 may be an air-conditioner, a ventilation unit, or the like installed on a ceiling of the room 12.

The discharge port 301 is opened toward the room 12. The discharge port 301 may be configured to be selectively opened and closed by a cover 303.

The exhaust fan is formed to intake air discharged from the total heat exchanger 200 and discharge the intaken air to the discharge port 301. The controller 400 controlling the ventilation system 10 may control the amount of air discharged to the room 12 by changing a rotation speed of the exhaust fan. For example, the controller 400 may increase the rotation speed of the exhaust fan when the amount of air discharged to the room 12 is required to be increased.

For reference, the room 12 includes an intake device 800. Contaminated air in the room 12 moves to the total heat exchanger 200 through the intake device 800, transfer heat to air moving along the air supply flow path, while moving along the air outlet flow path, and then is discharged to the outdoor area 11.

The intake device 800 may include a fan (not shown) so that air in the room 12 may be introduced into the intake device 800. In addition, the air outlet flow path of the total heat exchanger 200 may be provided with a switch (not shown) allowing or blocking air inflow of the room 12 and a fan (not shown) discharging introduced air to the outdoor area 11.

Meanwhile, as described later, the indoor air inlet 230 is connected to a bypass duct 231 connected to the washing part 100b. Accordingly, hot air supplied to the washing part 100b is introduced into the indoor air inlet 230 through the bypass duct 231 by the fan 102. That is, the air in the washing part 100b introduced by the bypass duct 231 and the air in the room 12 introduced to the indoor air inlet 230 pass through the heat exchange element 250, and then are discharged to the outdoor area 11 through the air outlet 240.

Hereinafter, the ventilation type air cleaner 100 will be described in more detail.

Figure 3:
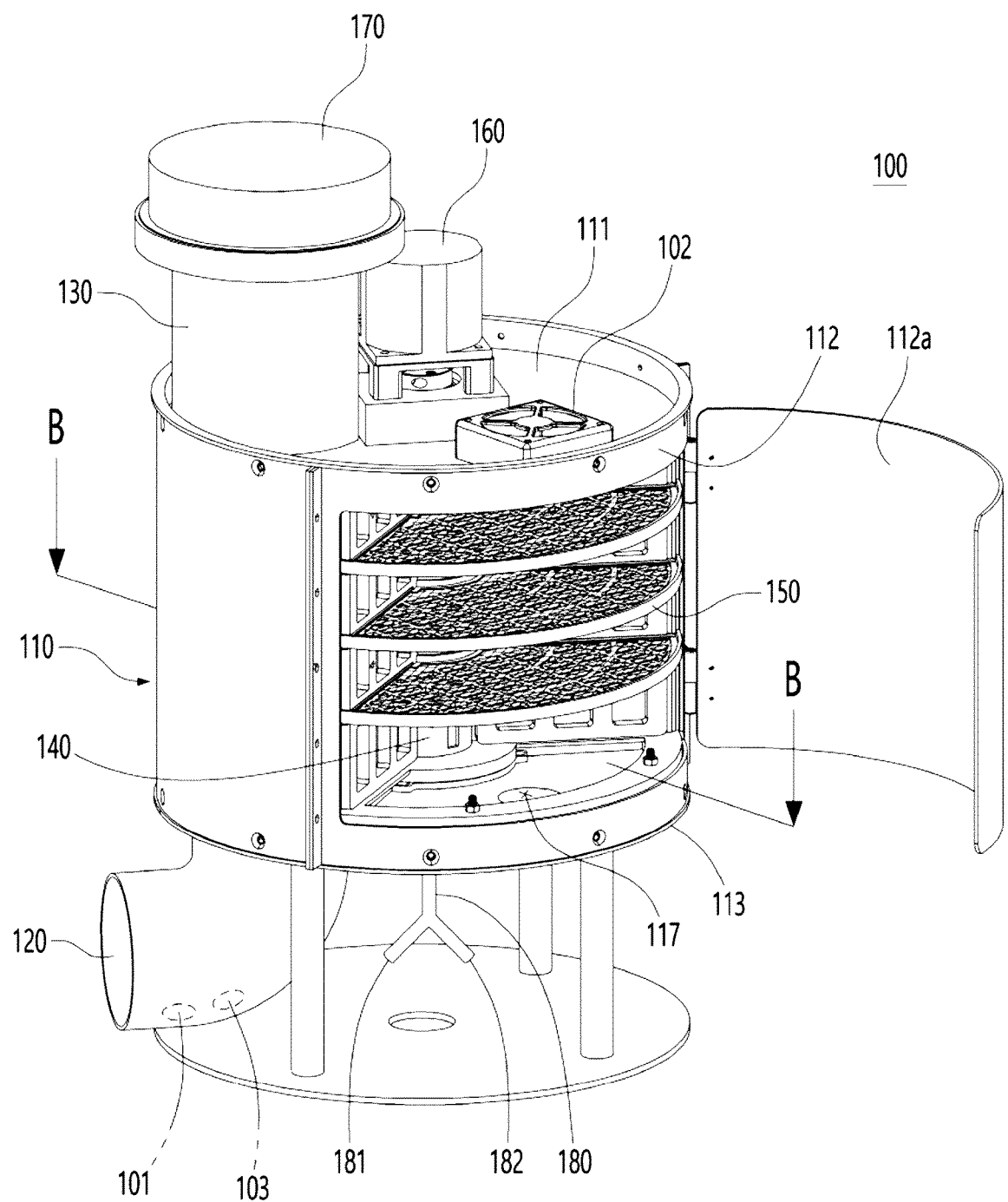
FIG. 3 is a perspective view of a ventilation type air cleaner illustrated in FIG. 1.
Figure 4:
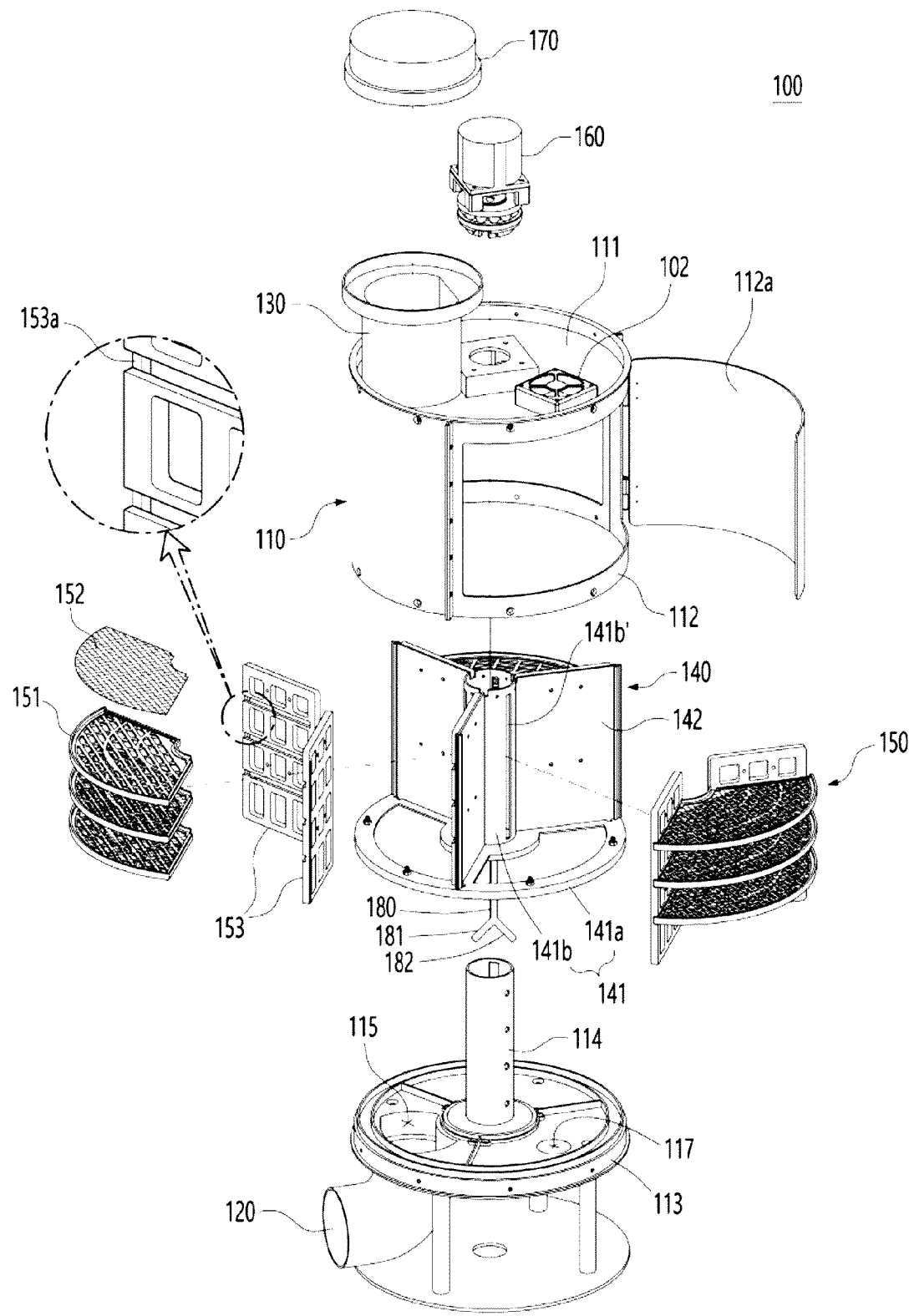
FIGS. 4 and 5 are exploded perspective views of a ventilation type air cleaner illustrated in FIG. 3, viewed from different directions.
Figure 5:
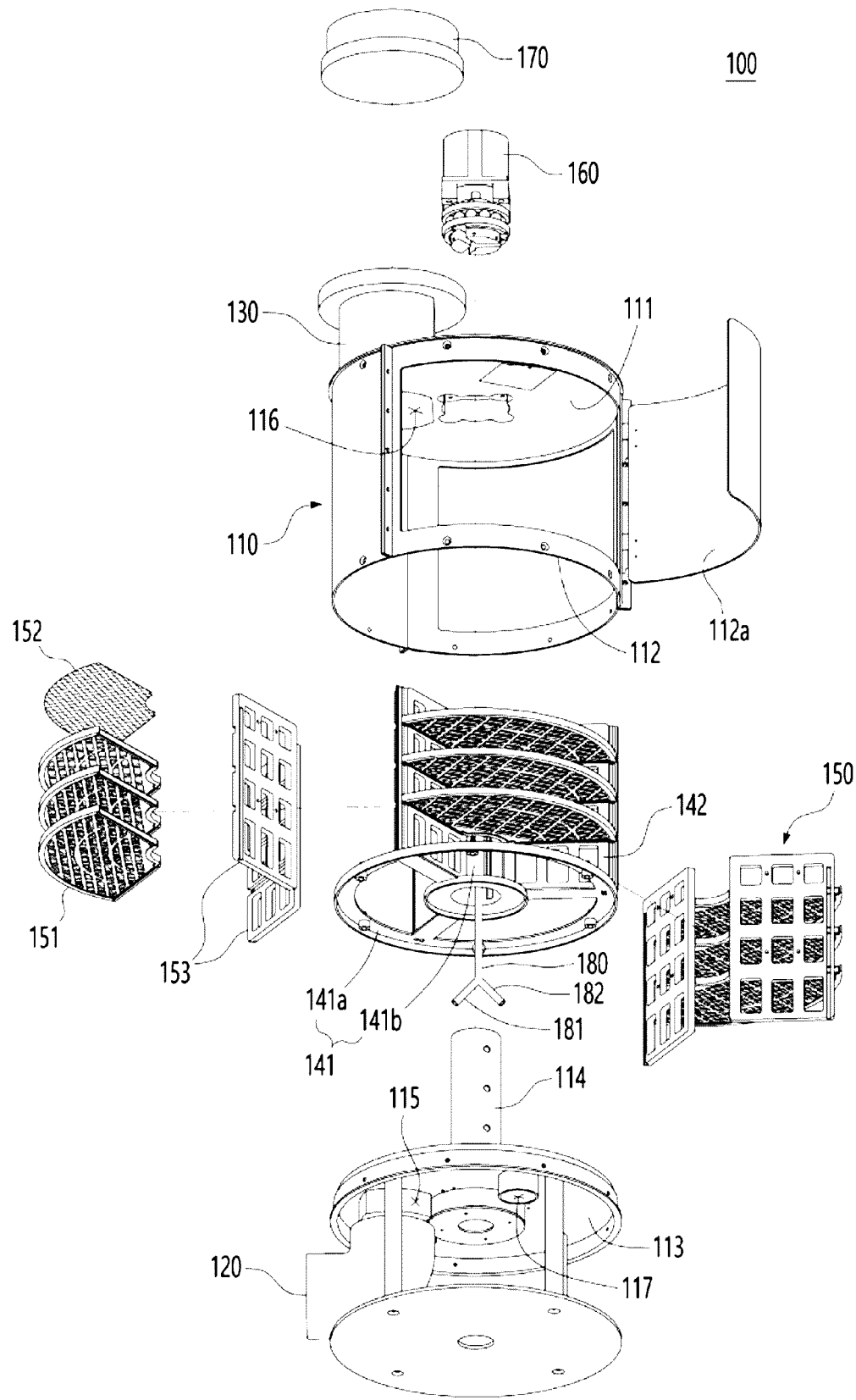

FIG. 3 is a perspective view of the ventilation type air cleaner 100 illustrated in FIG. 1, FIGS. 4 and 5 are exploded perspective views of the ventilation type air cleaner 100 illustrated in FIG. 3, viewed from different directions, and FIG. 6 is a cross-sectional view taken along the line B-B illustrated in FIG. 3.

Referring to FIGS. 3 to 6, the ventilation type air cleaner 100 includes a housing 110, the intake duct 120, the exhaust duct 130, a rotating unit 140, and the filter assembly 150.

The housing 110 includes a central rotating shaft therein, and the purification part 100a, the washing part 100b, and sterilization part 100c are sequentially provided in a circumferential direction around the central rotating shaft 114. For example, an internal space of the housing 110 may be divided into a purification part 100a, a washing part 100b, and a sterilization part 100c at intervals of 120 degrees along the circumferential direction about the central rotating shaft 114. For reference, the purification part 100a, the washing part 100b, and the sterilization part 100c are fixed regions in the housing 110.

As illustrated, the housing 110 may be formed by coupling a plurality of frames (or cases). In this figure, it is illustrated that the housing 110 is configured by fastening an upper frame 111, a side frame 112, and a bottom frame 113 by a mechanical element such as a bolt and has a cylindrical shape.

The side frame 112 may be provided with an openable door 112a to allow selective access to at least one of the purification part 100a, the washing part 100b, or the sterilization part 100c. In this embodiment, it is illustrated that the door 112a is provided at each of the side frame 112 defining the washing part 100b and the side frame 112 defining the sterilization part 100c.

Meanwhile, the washing part 100b is a region to which wash water and hot air are sprayed, and the sterilization part 100c is a region to which ultraviolet rays are irradiated. To this end, the interior of the housing 110 is provided with a spray unit 180 for spraying wash water and hot air and an ultraviolet irradiation unit 190 for ultraviolet irradiation. As illustrated, the spray unit 180 and the ultraviolet irradiation unit 190 may be located at the center of the central rotating shaft 114 (the outer circumference or inside thereof).

In the washing part 100b, the filter assembly 150 is washed with steam and then dried with hot air. To this end, the spray unit 180 is configured to selectively spray wash water and hot air and has an integrated structure for spraying wash water and hot air.

Referring to the drawings, the spray unit 180 includes a transfer pipe, a steam supply pipe 181, a hot air supply pipe 182, and a spray nozzle 183.

The transfer pipe is disposed in the central rotating shaft 114 and extends along the central rotating shaft 114. The steam supply pipe 181 supplying steam and the hot air supply pipe 182 supplying hot air are connected to one side of the transport pipe in a branched form, and the spray nozzle 183 is connected to the other side of the transport pipe in a branched form. When the filter assembly 150 is stacked to form a multi-stage, the spray nozzle 183 may also have a multi-stage branched form.

By the above configuration, in the case of cleaning the filter assembly 150, steam is supplied alone or steam and hot air are supplied together to wash away foreign matter accumulated in the filter assembly 150. Meanwhile, a drain 117 draining wash water including foreign matter is provided on a bottom of the washing part 100b. The bottom of the washing part 100b may be inclined downward in the direction of the drain 117.

When washing of the filter assembly 150 is completed, only hot air is supplied to dry the filter assembly 150. After the filter assembly 150 is rapidly dried by hot air, the filter assembly 150 may be sterilized and then used for purification.

Meanwhile, the steam supply pipe 181 may be connected to a tap water pipe (not shown) of the room 12 to use tap water supplied from the water pipe as wash water.

Alternatively, the steam supply pipe 181 may be configured to collect moisture generated in the room 12 and use the generated moisture as wash water. For example, a dehumidifier (not shown) for condensing moisture in the indoor air introduced into the total heat exchanger 200 may be connected to the indoor air inlet 230 of the total heat exchanger 200, and the steam supply pipe 181 may be connected to the dehumidifier to use water collected in the dehumidifier as wash water.

Meanwhile, the washing part 100b is connected to the bypass duct 231, and the bypass duct 231 is connected to the indoor air inlet 230. By the above configuration, after the filter assembly 150 is dried, air in the washing part 100b is introduced into the indoor air inlet 230 by the bypass duct 231, passes through the heat exchange element 250 together with the air in the room 12 introduced to the indoor air inlet 230, and then is discharged to the outdoor area 11 through the air outlet 240.

The washing part 100b may include a fan 102 discharging hot air from the washing part 100b. The fan 102 may be configured not to be driven in case of washing and to be driven only for drying.

The fan 102 may be installed on at least one surface of the housing 110 defining the washing part 100b. In this figure, it is illustrated that the fan 102 is installed at the upper frame defining the washing part 100b and the bypass duct 231 is disposed to cover the fan 102. That is, hot air supplied to the washing part 100b is introduced into the indoor air inlet 230 through the bypass duct 231 by the fan 102.

The ultraviolet irradiation unit 190 is configured to sterilize the filter assembly 150 by irradiating ultraviolet rays to the filter assembly 150 located at the sterilization part 100c.

A reflective part (not shown) reflecting ultraviolet rays emitted from the ultraviolet irradiation unit 190 may be disposed on an inner wall of the housing 110 defining the sterilization part 100c. The reflective part may include a metal having high ultraviolet reflectivity, may be applied in a coating layer form to the inner wall of the housing 110 or may be attached in a sheet form to the inner wall of the housing 110. A sterilization effect of the filter assembly 150 may be increased by the reflective part described above.

The intake duct 120 is connected to the housing 110 and guides a flow of air introduced into the purification part 100a, and the exhaust duct 130 is connected to the housing 110 and guides a flow of air discharged from the purification part 100a.

In this embodiment, air is introduced into a lower portion of the housing 110, purified in the purification part 100a, and then discharged to an upper portion of the housing 110.

To this end, an intake port 115 and an exhaust port 116 are provided at the lower and upper portions of the housing 110, respectively. The intake port 115 and the exhaust port 116 communicate with the purification part 100a and are located eccentrically with respect to the central rotating shaft 114. The intake port 115 is connected to the intake duct 120, and the exhaust port 116 is connected to the exhaust duct 130. At least a portion of the exhaust port 116 may overlap the intake port 115 in an up-down direction.

The rotating unit 140 is provided to be rotatable about the central rotating shaft 114 as a rotation center in the housing 110. The rotating unit 140 is rotated by a driving force provided from a drive unit 160 to be described later.

The rotating unit 140 includes a rotating member 141 and a plurality of blocking plates 142.

The rotating member 141 is installed to be rotatable about the central rotating shaft 114 as a rotation center. As illustrated, the rotating member 141 may include a base 141a formed in a circular shape and a hollow sleeve 141b protruding from the center of the base 141a and surrounding the central rotating shaft 114.

The sleeve 141b has a slot 141b' penetrating through the sleeve 141b and extending along a length direction of the sleeve 141b. As the rotating unit 140 rotates, the slot 141b' circulates around the central rotating shaft 114 to expose a portion of the central rotating shaft 114.

The slot 141b' is provided between each of two adjacent blocking plates 142. In this figure, it is illustrated that the slot 141b' is provided every 120 degrees along an outer circumference of the sleeve 141b.

At a predetermined rotational position of the rotating unit 140, the spray nozzle 183 and the ultraviolet irradiation unit 190 are simultaneously exposed through each slot 141b'.

A plurality of blocking plates 142 is disposed radially about the central rotating shaft 114. In this figure, it is illustrated that the plurality of blocking plates 142 is radially disposed and protrudes from the outer circumference of the sleeve 141b. The plurality of blocking plates 142 may be provided at intervals of 120 degrees along the circumferential direction with respect to the sleeve 141b.

The filter assembly 150 is disposed between two adjacent blocking plates 142. The filter assembly 150 is configured to sequentially circulate the purification part 100a, the washing part 100b, and the sterilization part 100c according to rotation of the rotating unit 140.

For reference, in this figure, it is illustrated that the filter assembly 150 is stacked in one direction to form a multi-stage shape, but the present disclosure is not limited thereto. The filter assembly 150 may be configured in one stage.

The filter assembly 150 includes a filter seating frame 151 and a filter 152.

The filter seating frame 151 is configured to allow the filter 152 to be seated thereon. In this figure, a fan-shaped filter seating frame 151 corresponding to a shape of the filter 152 is illustrated.

The filter seating frame 151 has a plurality of holes to allow air and wash water to pass therethrough.

The filter seating frame 151 may have a fixing structure (e.g., hook, cover, etc.) to prevent separation of the filter 152.

The filter seating frame 151 is fixed to the blocking plate 142. The filter seating frame 151 may be fixed to the blocking plate 142 in a directly coupling manner, or as illustrated, the filter seating frame 151 may be fixed to the blocking plate 142 such that the filter seating frame 151 is fastened to a fastening recess 153a of a coupling frame 153 and the coupling frame 153 is then coupled to the blocking plate 142. The filter seating frame 151 or the coupling frame 153 may be detachably attached to the blocking plate 142.

The filter 152 has a fan shape and is seated on or fixed to the filter seating frame 151. For example, the filter 152 may be seated on the filter seating frame 151 and then covered and fixed by a cover (not shown). Here, a plurality of holes is provided also in the cover to allow air and wash water to pass therethrough.

The filter 152 is formed of a washable material. For example, the filter 152 may be a conductive fiber filter in which a conductive coating layer covers a filter portion (nonwoven filter, microfiber filter, etc.) formed of a fiber material.

The filter portion of the fiber material may be formed of a natural fiber or synthetic fiber material. For example, the filter portion may be formed of a material such as polypropylene, polyester, polystyrene, polyethylene, polyethylene terephthalate (PET), teflon, cotton, or the like.

The conductive coating layer may be a metal coating layer, an alloy coating layer formed of two or more metals, a graphene coating layer, a carbon nanotube coating layer, or the like.

The metal coating layer may be formed of any metal without limitation as long as the metal is a good conductor of electricity. Specifically, the metal may be copper (Cu), silver (Ag), aluminum (Al), lithium (Li), sodium (Na), potassium (K), rubidium (Rb), cesium (Cs), beryllium (Be), magnesium (Mg), calcium (Ca), strontium (Sr), barium (Ba), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), gold (Au), cadmium (Cd), mercury (Hg), boron (B), gallium (Ga), indium (In), thallium (TI), silicon (Si), germanium (Ge), tin (Sn), lead (Pb), phosphorus (P), arsenic (As), antimony (Sb), bismuth (Bi).

For example, the conductive fiber filter may be a copper plated fiber filter coated with copper particles. As another example, the conductive fiber filter may be a silver plated filter coated with silver particles, and in this case, the conductive fiber filter may also perform an antibacterial action along with a purification function.

Alternatively, the conductive coating layer may be an alloy coating layer for corrosion protection or the like, and an alloy of a combination of two or more of the metals listed above may be used in the alloy coating layer without limitation.

For example, the alloy coating layer may be a copper alloy coating layer. For example, the copper alloy coating layer may be a Cu—Zn-based alloy including copper and zinc in a ratio of about 70:30.

Alternatively, the copper alloy coating layer is Cu—Ag-based, Cu—Cd-based, Cu—Cr-based, Cu—Be-based, Cu—Be—Co-based, Cu—Sn-based, Cu—Al-based, Cu—Ni-based, Cu—Si-based or Cu—Pb-based alloy.

Alternatively, the conductive coating layer may be a coating layer of a conductive material, such as graphene, carbon nanotubes, or the like in addition to the metal or alloy as described above.

For example, the conductive fiber filter may be a filter in which a coating layer such as a graphene composite coating layer, a graphene-oxide composite coating layer, a graphene-metal nanoparticle composite coating layer, and a carbon nanotube coating layer is formed on a fiber filter.

Further, the conductive fiber filter may be a filter in which the metal or alloy coating layer described above is primarily formed on a fiber filter and the graphene or carbon nanotube coating layer described above is secondarily formed thereon.

The conductive coating layer may be formed with a thickness of 10 nm to 500 nm on the filter portion of the fiber material. When the conductive coating layer is formed too thick, pores of the conductive fiber filter may be too small to effectively collect fine dust. If the conductive coating layer is formed too thin, electrical conductivity described later may not be sufficiently exhibited.

Meanwhile, the intake duct 120 or the purification part 100a may have a fine dust charging part 103 formed to charge fine dust being introduced. The ions or static electricity generated by the fine dust charging part 103 charge fine dust, and the charged fine dust may be adsorbed by the conductive filter.

The fine dust charging part 103 may be configured as a corona discharge device, an ion generator, or an electrostatic generator.

As such, when the conductive fiber filter is used, not only dust filtering is performed by the filter's own physical filter net mechanism but also fine dust charged by static electricity or the like is adsorbed to the conductive fiber filter in an electrostatic induction manner, thereby collecting fine dust more effectively.

Meanwhile, porosity of each stage filter 152 may be 50,000 CU to 500,000 CU in unit of Coresta.

When the filter assembly 150 is stacked in one direction to form a multi-stage shape, porosity of each stage filter 152 may be different from each other.

As illustrated, when it is configured such that air passes through the multi-stage filter 152 stacked in the up-down direction from the bottom and is discharged upward, the porosity of each stage filter 152 may be gradually decreased upward.

For example, the filter 152 located at the lowermost layer may have a porosity of 400,000 CU to 500,000 CU, and the filter 152 located at the uppermost layer may have a porosity of 50,000 CU to 100,000 CU. The filter 152 located therebetween may have a porosity of more than 100,000 CUs and less than 400,000 CUs.

Meanwhile, the exhaust duct 130 may be equipped with the HEPA filter 170 for filtering ultrafine dust passing through the filter assembly 150. The HEPA filter 170 is configured to filter dust in the air which has not been filtered in the purification part 100a. The HEPA filter 170 may be formed of a replaceable cartridge type filter.

Meanwhile, the drive unit 160 is provided to generate a driving force for rotating the rotating unit 140 and transfer the generated driving force to the rotating unit 140. The drive unit 160 rotates the rotating unit 140 at a predetermined rotation angle so that each filter assembly 150 located between the plurality of blocking plates 142 is located to correspond to the purification part 100a, the washing part 100b, and the sterilization part 100c. For example, the drive unit 160 may be provided to rotate the rotating unit 140 by 120 degrees each time a signal is applied.

The drive unit 160 includes a drive motor generating a driving force and a driving force transfer unit transferring the driving force to the rotating unit 140. A stepping motor may be used as the driving motor, and at least one of a (deceleration) gear, a cam, and a bearing may be used as the driving force transfer unit.

In this figure, it is illustrated that the drive unit 160 is installed to correspond to the central rotating shaft 114 on an upper portion of the housing 110. However, the present disclosure is not limited thereto, and the drive unit 160 may be mounted on a lower portion of the housing 110.

The filter assembly 150 is configured to sequentially circulate through the purification part 100a, washing part 100b, and the sterilization part 100c each time the rotating unit 140 is rotated by the drive unit 160 at a predetermined rotation angle. That is, when the rotating unit 140 is rotated, the filter assembly 150 located at the purification part 100a moves to the washing part 100b, when the rotating unit 140 is rotated again, the filter assembly 150 moves to the sterilization part 100c, and when the rotating unit 140 is rotated again, the filter assembly 150 moves to return to the purification part 100a.

Figure 7:
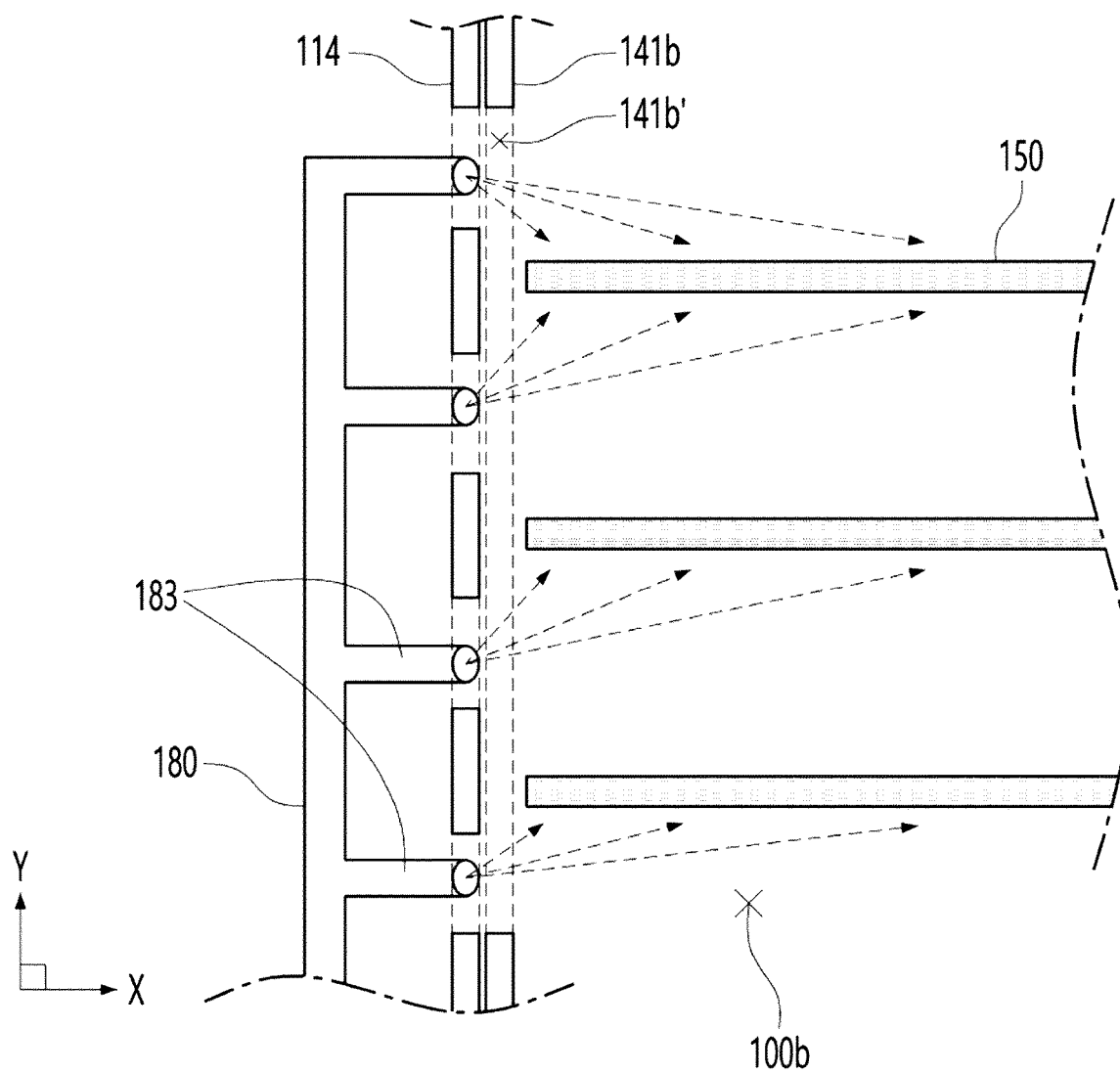
FIG. 7 is a conceptual view illustrating an arrangement relationship between a filter assembly and a spray nozzle illustrated in FIG. 4.

FIG. 7 exemplarily illustrates an arrangement relationship between the filter assembly 150 and the spray nozzle 183 when the filter assembly 150 is configured in multiple stages.

Referring to FIG. 7, the spray nozzle 183 is disposed between two adjacent filter assemblies 150 and configured to spray wash water toward at least one of upper or lower filter assembly 150. To this end, the spray nozzle 183 is configured to spray wash water in an upwardly inclined direction or a downwardly inclined direction toward the filter assembly 150.

The spray nozzle 183 is configured to spray wash water to at least one of upper or lower surface of the filter assembly 150.

Considering a flow direction of air in the purification part 100a, more dust may be adsorbed to one surface (lower surface in this embodiment) of the filter assembly 150 into which air is introduced than the other surface (upper surface in this embodiment). In consideration of this, the spray nozzle 183 may be configured to spray wash water toward the one surface of the filter assembly 150. This is merely one example, and of course, the spray nozzle 183 may be configured to spray wash water toward the other surface of the filter assembly 150.

In this figure, it is illustrated that the spray nozzle 183 is disposed on a lower side of the filter assembly 150 of each stage and sprays wash water toward the lower surface of the filter assembly 150. As illustrated, the spray nozzle 183 may also be formed on an upper side of the filter assembly 150 at an upper stage and spray wash water toward the upper surface of the filter assembly 150.

The spray nozzle 183 may be configured to automatically adjust a wash water spray angle. For example, the spray nozzle 183 may be configured to gradually increase or decrease the wash water spray angle within a predetermined range while wash water is being sprayed.

Alternatively, the transfer pipe supplying wash water to each of the spray nozzle 183 may be configured to be movable along a direction of the central rotating shaft 114 (Y-axis direction in FIG. 7).

By the angle adjusting function of the spray nozzle 183 or the movement function of the transfer pipe, the entire regions of the filter assembly 150 at each stage may be uniformly washed.

Figure 8:
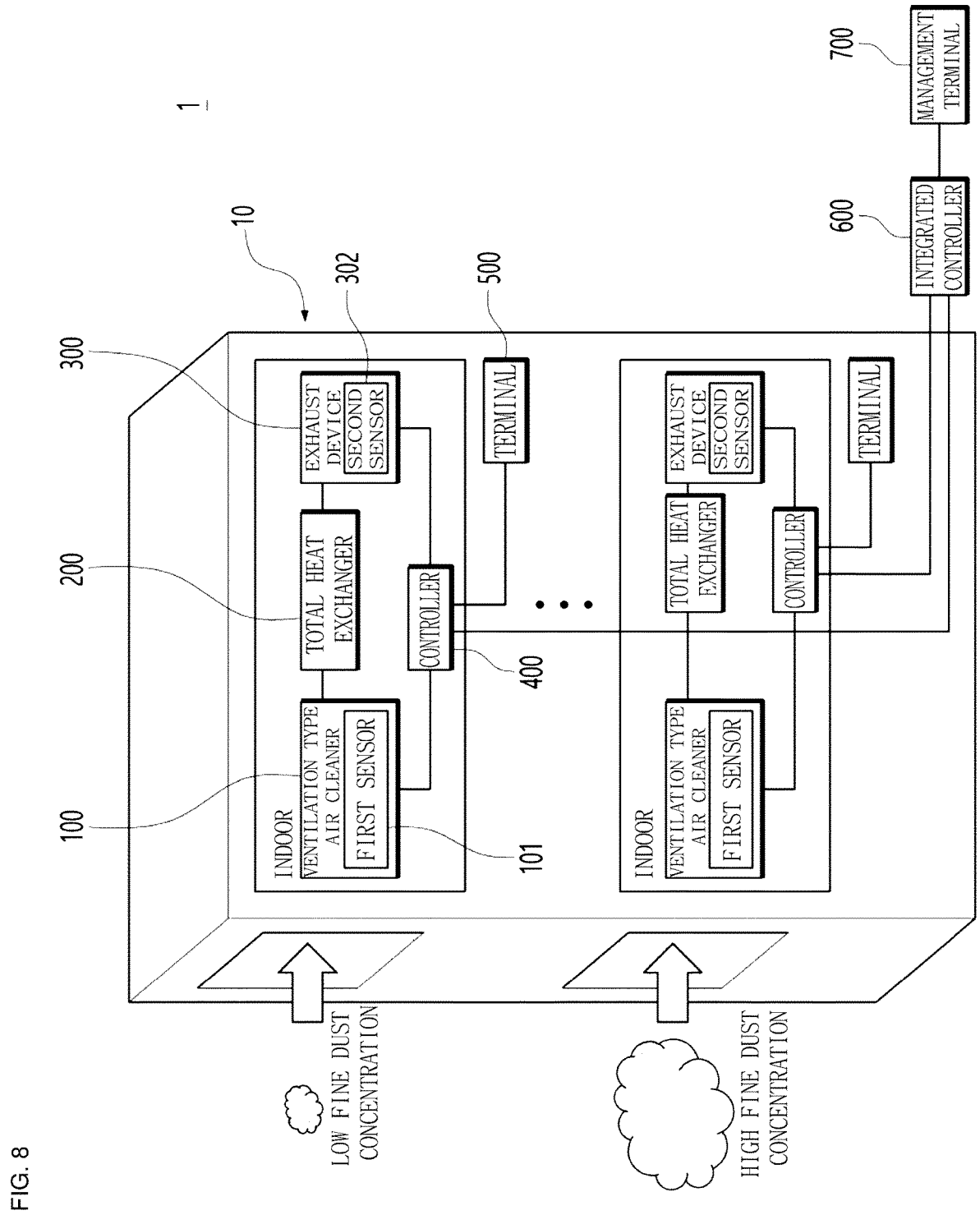
FIG. 8 is a conceptual view illustrating an example in which the ventilation system illustrated in FIG. 1 is integratedly controlled.
Figure 9B:
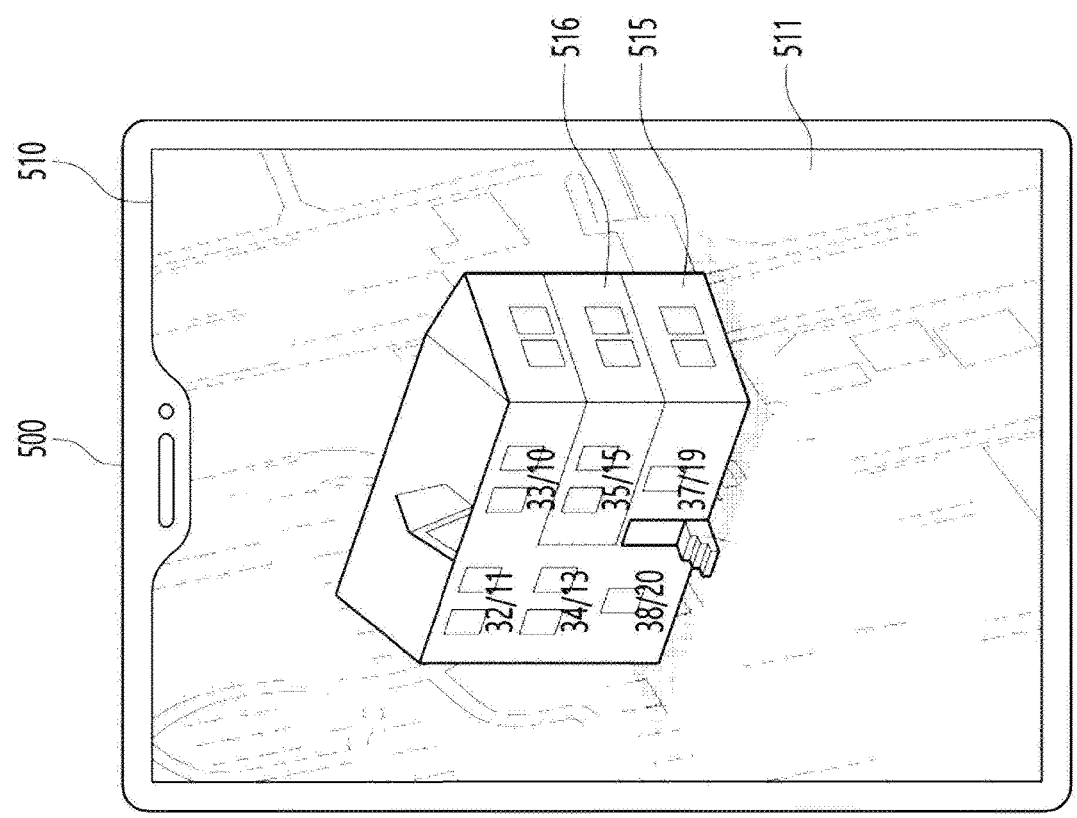
FIG. 9A and FIG. 9B show a conceptual view illustrating an example of information displayed on a terminal illustrated in FIG. 8.
Figure 9A:
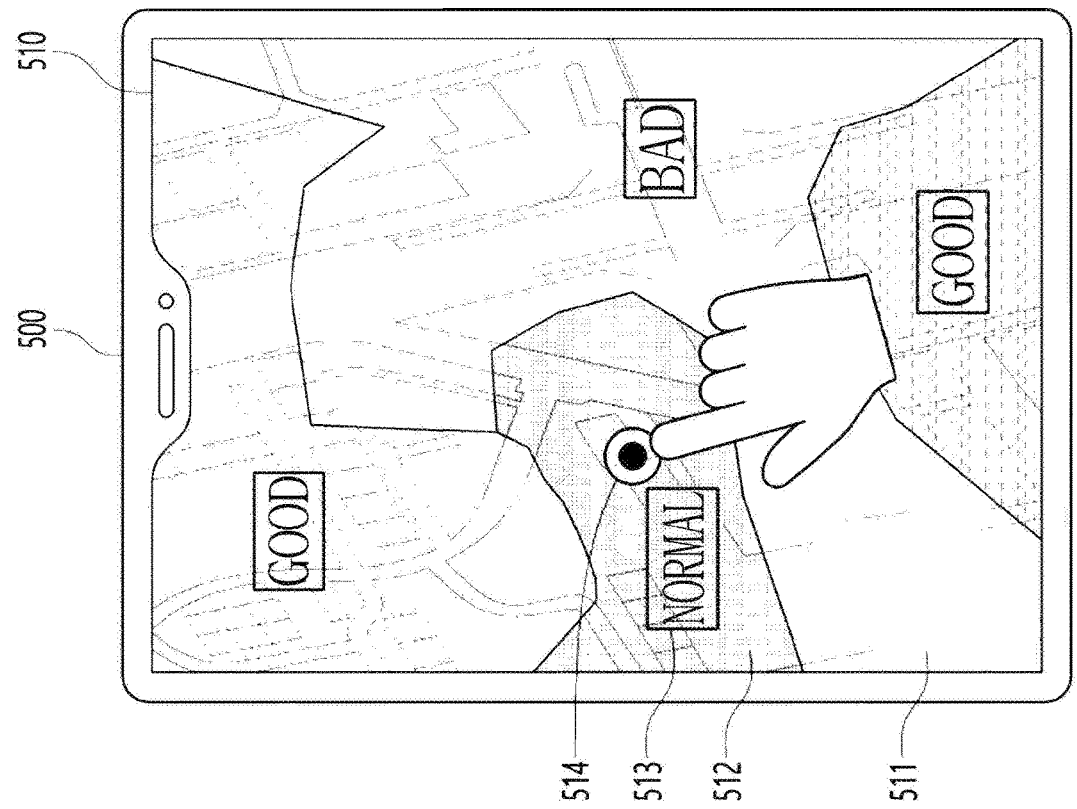

FIG. 8 is a conceptual view illustrating an example in which the ventilation system 10 illustrated in FIG. 1 is integratedly controlled, and FIG. 9A and FIG. 9B show a conceptual view illustrating an example of information displayed on a terminal 500 illustrated in FIG. 8.

First, referring to FIG. 8 together with FIG. 1, the ventilation type air cleaner 100 includes a first sensor 101 measuring quality of air introduced into the ventilation type air cleaner 100. The first sensor 101 may be disposed at the intake duct 120 or the purification part 100a. That is, air measured by the first sensor 101 corresponds to external air before purification is performed.

The exhaust device 300 includes a second sensor 302 measuring air quality. The second sensor 302 may be disposed adjacent to the discharge port 301. Air measured by the second sensor 302 corresponds to indoor air.

Air quality of the room may vary due to various factors (food cooking, breathing, etc.). The second sensor 302 may measure quality of air while an exhaust fan (not shown) is actuated so that quality of air discharged through the discharge port 301 in the indoor air may be measured.

The ventilation type air cleaner 100 and the exhaust device 300 are controlled to be driven by the controller 400. The controller 400 is connected to the first and second sensors 101 and 302 to control the ventilation system 10 or transmit information or alarm to the predetermined terminal 500 using air quality data obtained from the first and second sensors 101 and 302.

For example, if an air quality value detected by the first sensor 101 exceeds a predetermined value (when the air quality is bad), a speed or an amount of dust adsorbed to the filter assembly 150 is increased, and thus the controller 400 may reduce a rotation period of the rotating unit 140 so that the filter assembly 150 may be frequently washed and sterilized.

As another example, the controller 400 may be configured to transmit air quality information related to data measured by the first and second sensors 101 and 302 to a predetermined terminal. Here, the predetermined terminal may be the terminal 500 of a user. Accordingly, the user may obtain comparison data for outdoor air quality and indoor air quality.

As another example, if an air quality value detected by the second sensor 302 exceeds the predetermined value in a state in which the exhaust fan of the exhaust device 300 is actuated, the controller 400 may transmit an alarm to the predetermined terminal 500. Here, the predetermined terminal may be the terminal 500 of the user or a management terminal 700 of an integration administrator. The user or administrator may recognize that there is an error in the ventilation system 10 through the alarm.

As such, the indoor air quality may be more efficiently managed using the quality of the air flowing into the ventilation type air cleaner 100 measured by the first sensor 101 and the quality of the air discharged to the room measured by the second sensor 302.

Meanwhile, the controller 400 of each ventilation system 10 located in different spaces may be connected to an integrated controller 600, and the integrated controller 600 may be connected to the management terminal 700 of the integration manager. In this case, the integrated controller 600 may receive data obtained from the first and second sensors 101 and 302 of each ventilation system 10 and provide good air quality management service to the user using the collected big data.

As an example, the integrated controller 600 may provide air quality information of a corresponding area to users who use the ventilation system 10 using data obtained from each ventilation system 10. The air quality information includes numerical information on air quality, schematic information, and the like.

FIG. 9A and FIG. 9B show examples in which the integrated controller 600 transmits air quality information to the terminal 500 of the user and air quality information schematizing air quality of the outside and the room is displayed on a display unit 510.

Specifically, when the integrated controller 600 is configured to integratedly manage a plurality of ventilation systems 10 in a certain area, as illustrated in FIG. 9A, the integrated controller 600 may schematize air quality information of a user area (surrounding area within a predetermined distance based on a point 514 at which the ventilation system 10 is located) and provide the information to the terminal 500 of the user.

For example, the display unit 510 may display a plurality of regions 512 classified into different air quality groups according to a predetermined air quality reference on a map 511 of a user area. In addition, corresponding air quality may be displayed in a character 513 or number in each of the plurality of regions 512.

In addition, as illustrated in FIG. 9B, when the integrated controller 600 groups and manages the ventilation system 10 as a specific group (e.g., ventilation system 10 in a building 515), the integrated controller 600 may schematize air quality information of the specific group and air quality information 516 of a user location (where the ventilation system 10 is located) and provide the same.

For example, air quality information of locations of the building 515 where the user's ventilation system 10 is located is displayed in characters or numbers. Here, the air quality information of the user's ventilation system 10 may be displayed to be distinguished from other air quality information in a different color, size, or the like.

The air quality information illustrated in FIGS. 9A and 9B may be switched to each other according to the user's input to the display unit 510.

For example, in the state illustrated in FIG. 9A, when a user's touch input is applied to a predetermined position (e.g., the point 514 where the user's ventilation system 10 is located) on the display unit 510, the corresponding state may be switched to the state illustrated in FIG. 9B.

As such, the user may be provided with the information related to the air quality (air pollution map of a predetermined region, etc.) in real time, and the administrator may be provided with information or big data for a good quality service (provision of emergency dispatch service according to a result of indoor air quality values).

The effects of the present disclosure obtained through the solutions described above are as follows.

First, by placing the ventilation type air cleaner which filters ultrafine dust to a 99% level before external air flows into the total heat exchanger and has an automatic cleaning function, burden of dust filtering of the total heat exchanger may be reduced to reduce time and cost required for maintenance.

In particular, since the filter assembly of the ventilation type air cleaner is configured to filter dust in the purification part, sequentially pass through the washing part and the sterilization part, and be located again at the purification part, separate filter replacement is not necessary and the filter assembly may be semi-permanently used.

Therefore, by replacing only the HEPA filter installed at the exhaust duct (long replacement cycle), a replacement cycle of the pre-filter and the HEPA filter of the total heat exchanger may be delayed so that efforts and cost for maintenance of the total heat exchanger may be significantly reduced.

Second, indoor air quality may be more efficiently managed using quality of air flowing into the ventilation type air cleaner measured by the first sensor and quality of air discharged into the room measured by the second sensor.

For example, the user may be provided with information (air pollution map for a predetermined region, etc.) related to quality of air in real time and the administrator may be provided with information or big data for a good quality service (provision of emergency dispatch service according to a result of an indoor air quality value).

While embodiments have been shown and described above, it will be apparent to those skilled in the art that modifications and variations could be made without departing from the scope of the present disclosure as defined by the appended claims.

What is claimed is:

1. A ventilation type air cleaner comprising:
   a housing having a central rotating shaft therein and including a purification part, a washing part, and a sterilization part in a circumferential direction with respect to the central rotating shaft;
   a rotating unit installed to be rotatable about the central rotating shaft, the central rotating shaft providing a rotation center in the housing;
   a filter assembly detachably coupled to the rotating unit and configured to sequentially pass through the purification part, the washing part, and the sterilization part according to a rotation of the rotating unit;
   an intake duct connected to the housing and configured to guide a flow of air introduced to the purification part; and
   an exhaust duct connected to the housing and configured to guide a flow of air discharged from the purification part,
   wherein the intake duct and the exhaust duct are connected between the outside and a total heat exchanger so that external air flows into the total heat exchanger after passing through the purification part.

2. The ventilation type air cleaner of claim 1, wherein the intake duct communicates with an outdoor area so that the external air flows into the purification part, and the exhaust duct communicates with an external air inlet of the total heat exchanger so that air passing through the purification part flows into the total heat exchanger.

3. The ventilation type air cleaner of claim 2, wherein the housing includes:
   an intake port opened at an off-centered position with respect to the central rotating shaft at a lower portion of the housing, communicating with the purification part, and connected to the intake duct; and
   an exhaust port opened at an off-centered position with respect to the central rotating shaft at an upper portion of the housing, communicating with the purification part, and connected to the exhaust duct.

4. The ventilation type air cleaner of claim 1, wherein
the rotating unit includes a plurality of blocking plates disposed radially about the central rotating shaft, and the filter assembly is disposed between the plurality of blocking plates, and wherein the ventilation type air cleaner further comprises:

a driving unit configured to rotate the rotating unit such that regions between the plurality of blocking plates are located to correspond to the purification part, the washing part, and the sterilization part, respectively.

5. The ventilation type air cleaner of claim 1, further comprising:

a spray unit configured to spray wash water and hot air to the filter assembly when the filter assembly is located at the washing part; and an ultraviolet irradiation unit configured to irradiate ultraviolet rays to the filter assembly when the filter assembly is located at the sterilization part.

6. The ventilation type air cleaner of claim 5, wherein the spray unit includes:

a transfer pipe disposed in the central rotating shaft and extending along the central rotating shaft and having branched ends on one side of the transfer pipe;

a steam supply pipe connected to any one of the branched ends of the transfer pipe and configured to supply steam to the transfer pipe;

a hot air supply pipe connected to another one of the branched ends of the transfer pipe and configured to supply hot air to the transfer pipe; and a spray nozzle connected to another side of the transfer pipe and configured to spray steam and hot air to the filter assembly.

7. The ventilation type air cleaner of claim 6, further comprising:

a bypass duct connected to each of the washing part and an indoor air inlet unit of the total heat exchanger through which indoor air is introduced; and a fan installed on at least one surface of the housing defining the washing part and configured to discharge hot air in the washing part to the bypass duct.

8. The ventilation type air cleaner of claim 1, wherein the filter assembly includes a conductive fiber filter formed by coating a fiber material with conductive particles, and the intake duct or the purification part includes a fine dust charging part configured to charge fine dust introduced therein.

9. The ventilation type air cleaner of claim 8, wherein the conductive fiber filter is stacked in one direction to form a multi-stage form, and wherein a porosity of the conductive fiber filter gradually decreases along the one direction.

10. The ventilation type air cleaner of claim 1, wherein the exhaust duct is equipped with a HEPA filter filtering ultrafine dust passing through the filter assembly.

11. A ventilation system comprising the ventilation type air cleaner according to claim 1, wherein the ventilation type air cleaner is configured to intake external air, purify the intaken external air, and discharge the purified air to the total heat exchanger; and an exhaust device configured to supply air discharged from the total heat exchanger to a room, wherein the exhaust device includes a discharge port and an exhaust fan configured to intake air discharged from the total heat exchanger and discharge the intaken air to the discharge port.

12. The ventilation system of claim 11, wherein the intake duct or the purification part of the ventilation type air cleaner includes a first sensor configured to measure air quality, and the exhaust device includes a second sensor configured to measure air quality.

13. The ventilation system of claim 12, further comprising:

a controller configured to transmit an alarm to a predetermined terminal when an air quality value detected by the second sensor exceeds a predetermined air quality value in a state in which the exhaust fan is actuated.

14. The ventilation system of claim 12, further comprising:

a controller configured to collect data measured by the first sensor and the second sensor and transmit air quality information related to the collected data to a predetermined terminal.

15. The ventilation system of claim 14, wherein the air quality information is information schematizing air quality of the outside and the room.

* * * * *